United States Patent Office 3,277,205
Patented Oct. 4, 1966

3,277,205
ENHANCEMENT OF CONVERSION OF CATALYTIC DEHYDROCHLORINATION BY DILUTION WITH AN INERT GAS
Mack F. Hughes, Albany, Calif., assignor to Chevron Research Company, a corporation of Delaware
No Drawing. Filed Jan. 6, 1964, Ser. No. 336,042
5 Claims. (Cl. 260—677)

This invention concerns an improvement in the catalytic dehydrochlorination of monochloroalkanes. More particularly, this invention concerns the dilution of the reactor vapors with an inert gas in the catalytic dehydrochlorination of monochloroalkanes.

Straight-chain olefins in the $C_9$–$C_{20}$ range have a variety of uses. Those olefins in the lower portion range can be used to alkylate benzene which in turn may be sulfonated to form the alkylbenzene detergent. The olefins in the higher portion range may be directly combined with various functional groups, such as amines, sulfonic acid or carboxylic acid groups, to form compounds having detergent properties. Moreover, the straight-chain alkyl groups are found to be readily biodegraded in common sewage systems.

One of the routes to the olefins is the isolation of alkanes from petroleum, separation of the normal alkanes from the isoparaffins and aromatics, chlorination and then catalytic dehydrochlorination. The alkyl chloride is passed over a solid acidic dehydrochlorination catalyst in either the liquid or solid phase, the hydrogen chloride vented and the olefin collected.

Pursuant to this invention, improved selectivity and activity is obtained in the dehydrochlorination over solid acidic catalysts of monochloro normal alkanes of at least 9 carbons by maintaining a partial pressure of an inert gas in the reactor.

The feed stock used in this process is a normal alkane mixture or a single hydrocarbon of from $C_9$–$C_{20}$, preferably from $C_{10}$–$C_{15}$. Usually, only from about 15 to 35 mol percent will be monochlorinated. The remainder of the organic mixture will be normal alkanes.

The catalysts used are acidic dehydrochlorination catalysts. Illustrative of such catalysts are alumina, chromia-alumina, silica-alumina, etc.; the preferred acidic catalysts are those containing alumina.

The temperature at which the dehydrochlorination is to be carried out is in the range of about 365 to 575° F., preferably 425 to 550° F. Preferred space rates will be in the range of about 0.35 to 100, preferably about 0.6 to 30. The pressure may vary from atmospheric to about 100 p.s.i.g., but will usually be superatmospheric. The pressure should be sufficient to mtaintain the halohydrocarbons predominantly in the liquid phase.

Any inert gas may be used. The common gases include nitrogen, helium, argon, carbon dioxide, tetrafluoromethane, etc. By inert it is intended that the gas does not react with the chlorohydrocarbon, the hydrocarbon—if present—or the olefin product, nor should it be strongly absorbed onto the catalyst surface. Such gases are well known in the art and do not require extensive exemplification.

The inert gas will be introduced at a rate which is sufficient to lower the partial pressure of the liberated hydrogen chloride to less than about 1.5 atmospheres, preferably to about 1 atmosphere. The hydrogen chloride partial pressure will generally be less than 35% of the total pressure of the system. The rate of introduction of the inert gas will, therefore, be a function of the operating presure. In most runs the rate of introduction of the inert gas will be from 1 to 6 mols per mol of chlorohydrocarbon; more usually the rate will be 2 to 6 mols per mol of chlorohydrocarbon.

An illustrative method of performing the process is to introduce the feed as a liquid together with the inert gas into the reaction zone which is maintained at the desired temperature. At the temperatures and pressures, a major portion of the reactants will be in the liquid phase and a minor portion in the vapor phase. The fluid feed is passed through the catalyst which is present in the form of granules and then condensed in a collection zone. The hydrogen chloride formed in the reaction may be removed from the product in any desired manner, most of the hydrogen chloride will have been vented as a gas, only a small amount of hydrogen chloride remaining dissolved in the liquid phase.

By carrying out the process as described, isomerization to undesired branched and cyclic compounds is lessened by an improved catalyst selectivity, conversion is increased and activity of the catalyst is maintained for longer times.

The following examples are by way of illustration and not by way of limitation.

*Example 1*

The reactor comprised a 1-inch steel tube fitted with a bottom entry for chlorinated paraffin and a sideport takeoff at about the 100 ml. level. At the top was a reflux condenser. Pressure was maintained on the system by means of a Grove Loader. The temperature was maintained by immersing the reactor in a hot oil bath. The tube was packed with a granular catalyst for about 9 cm. The feed was pumped into the bottom of the tube and flowed up across the catalyst and then discharged through the sideport. The evolved hydrogen chloride was taken overhead through the condenser and into a water scrubber.

Product from the reactor was analyzed for chloride content (by burning) and for olefinic unsaturation by bromine number.

The following data indicate a number of examples carried out according to the apparatus and process as above.

In Table I, the catalyst was alumina (RA-3), while in Table II the catalyst was chromia impregnated alumina (Houdry-C). The amount of nitrogen was sufficient to maintain a partial pressure of hydrogen chloride in the reactor of about 1 atmosphere.

TABLE I

| S. V. g. feed, g. cat. | Temp. ° F. | Pressure p.s.i.g. | Total g. feed, g. cat. | Wt. percent chloride in product | Mole percent conversion | Br. No. | Br. No. based on mole percent converted | Percent of possible Br. No. | Wt. percent chloride in feed | $N_2$ |
|---|---|---|---|---|---|---|---|---|---|---|
| 12.1 | 506 | 50 | 1.91 | 0.32 | 93.5 | | | | 4.8 | Yes. |
| | | | 10.1 | 0.46 | 90.8 | 16.7 | 21.8 | 76.7 | | |
| | | | 18.65 | 0.52 | 89.5 | | | | | |
| | | | 26.6 | 0.59 | 88.3 | 17.15 | 21.15 | 81.4 | | |
| 12.1 | 515 | 50 | 6.24 | 0.47 | 90.8 | 11.05 | 20.45 | 57.8 | 4.8 | No. |
| | | | 14.4 | 0.53 | 89.5 | 13.42 | 20.15 | 66.7 | | |
| | | | 23.6 | 0.59 | 88.3 | 14.55 | 19.85 | 73.3 | | |
| | | | 31.1 | 0.63 | 87.4 | 14.95 | 19.70 | 75.8 | | |

TABLE II

| S.V. g. feed, g. cat. | Temp. °F. | Pressure p.s.i.g. | Total g. feed, g. cat. | Wt. percent chloride in product | Mole percent conversion | Br. No. | Br. No. based on mole percent converted | Percent of possible Br. No. | Wt. percent chloride in feed | $N_2$ |
|---|---|---|---|---|---|---|---|---|---|---|
| 12.1 | 503–510 | 50 | 5.95 | 0.62 | 87.5 | 17.08 | 21.0 | 81.3 | 4.8 | Yes. |
| | | | 14.9 | 0.74 | 85.5 | 18.25 | 20.5 | 89.0 | | Yes. |
| | | | 23.6 | 0.82 | 83.8 | 18.20 | 20.1 | 90.7 | | Yes. |
| | | | 35.0 | 0.96 | 81.3 | | | | | Yes. |
| | | | 43.5 | 1.39 | 73.8 | | | | | No. |
| | | | 51.9 | 1.36 | 74.3 | 15.6 | 17.5 | 89.1 | | No. |
| | | | 60.5 | 1.04 | 80.0 | | | | | Yes. |
| | | | 70.3 | 1.07 | 79.5 | 17.9 | 18.9 | 94.8 | | Yes. |

The table shows that by introducing an inert gas into the reactor, increased conversions are obtained and that the amount of dehydrochlorination resulting in naphthenic products is reduced.

As will be evident to those skilled in the art, various modifications on this process can be made or followed, in the light of the foregoing disclosure and discussion, without departing from the spirit or scope of the disclosure or from the scope of the following claims.

I claim:

1. In a process for the dehydrochlorination of alkyl monochlorides of from 9 to 20 carbons to monoolefins which comprises:
    contacting the alkyl monochlorides with a solid acidic dehydrochlorination catalyst at a temperature in the range of about 365 to 575° F. and a pressure at least sufficient to maintain the alkyl monochloride primarily in the liquid phase,
    the improvement which comprises maintaining a partial pressure of an inert gas in the reactor.

2. A method according to claim 1 wherein the temperature is in the range of about 425 to 550° F., and sufficient inert gas is present in the reactor to lower the partial pressure of hydrogen chloride to about 1 atmosphere and the catalyst contains, at least in part, alumina.

3. A method according to claim 2 wherein the gas is nitrogen.

4. A method according to claim 1 wherein the gas is nitrogen.

5. In a process for the dehydrochlorination of alkyl monochlorides of from 10 to 15 carbons to monoolefins which comprises:
    contacting the alkyl monochlorides with a solid acidic dehydrochlorination catalyst, which is composed at least in part of alumina, at a temperature in the range of about 425 to 550° F. and a super-atmospheric pressure, but less than 100 p.s.i.g. and at least sufficient to maintain the alkyl monochlorides primarily in the liquid phase,
    the improvement which comprises introducing into the reactor nitrogen in an amount sufficient to reduce the partial pressure of hydrogen chloride in the reactor to less than 35% of the total pressure.

References Cited by the Examiner

UNITED STATES PATENTS

| | | | |
|---|---|---|---|
| 2,277,650 | 3/1942 | Cunradi et al. | 260—677 |
| 2,488,038 | 11/1949 | Gorin et al. | 260—677 |
| 2,491,786 | 12/1949 | Weinrich | 260—677 |
| 2,504,919 | 4/1950 | Bordner | 260—677 |

ALPHONSO D. SULLIVAN, *Primary Examiner.*